(12) United States Patent
Cacho

(10) Patent No.: US 6,273,155 B1
(45) Date of Patent: Aug. 14, 2001

(54) OIL COLLECTING AND DRAINING DEVICE

(76) Inventor: Leonardo C. Cacho, 5746 W. Patterson, Chicago, IL (US) 60634

( * ) Notice: Subject to any disclaimer, the term of this patent is extended or adjusted under 35 U.S.C. 154(b) by 0 days.

(21) Appl. No.: 09/797,661

(22) Filed: Mar. 5, 2001

(51) Int. Cl.$^7$ .................................................. B65B 1/04
(52) U.S. Cl. ........................... 141/98; 141/331; 141/340; 184/106
(58) Field of Search .................................. 141/331–345, 141/98, 106; 184/1.5, 106

(56) References Cited

U.S. PATENT DOCUMENTS

| | | |
|---|---|---|
| D. 351,394 | 10/1994 | Morris . |
| 956,399 | 4/1910 | Morse . |
| 4,301,841 | * 11/1981 | Sandow .................................. 141/98 |
| 4,802,599 | 2/1989 | Hill . |
| 4,886,233 | 12/1989 | Bateman et al. . |
| 5,285,824 | 2/1994 | Krstovic . |
| 5,402,837 | 4/1995 | Dietzen . |

* cited by examiner

*Primary Examiner*—Steven O. Douglas

(57) ABSTRACT

A oil collecting and draining device for easy transportation and depositing of oil drained from a vehicle. The oil collecting and draining device includes a housing having a top wall, a bottom wall, a front wall, a back wall, a first side wall, and a second side wall. The top wall is generally divided into a first portion positioned adjacent to the back wall and a second portion positioned adjacent to the front wall. The top wall is collapsed toward the bottom wall and has a lowest point located in a central area of the first portion. The top wall has an aperture therein extending into an interior of the housing. The aperture is located in the central area of the first portion. A pipe is attached to the front wall and is in communication with an interior of the housing. A valve is positioned on the pipe for selectively opening or closing the pipe. A support structure supports the housing above a ground surface.

11 Claims, 2 Drawing Sheets

OIL COLLECTING AND DRAINING DEVICE

BACKGROUND OF THE INVENTION

1. Field of the Invention

The present invention relates to oil collecting devices and more particularly pertains to a new oil collecting and draining device for easy transportation and depositing of oil drained from a vehicle.

2. Description of the Prior Art

The use of oil collecting devices is known in the prior art. More specifically, oil collecting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,802,599; 5,285,824; 956,399; 4,886,233; 5,402,837; and U.S. Des. Pat. No. 351,394.

While these devices fulfill their respective, particular objectives and requirements, the aforementioned patents do not disclose a new oil collecting and draining device. The inventive device includes a housing having a top wall, a bottom wall, a front wall, a back wall, a first side wall, and a second side wall. The top wall is generally divided into a first portion positioned adjacent to the back wall and a second portion positioned adjacent to the front wall. The top wall is collapsed toward the bottom wall and has a lowest point located in a central area of the first portion. The top wall has an aperture therein extending into an interior of the housing. The aperture is located in the central area of the first portion. A pipe is attached to the front wall and is in communication with an interior of the housing. A valve is positioned on the pipe for selectively opening or closing the pipe. A support structure supports the housing above a ground surface.

In these respects, the oil collecting and draining device according to the present invention substantially departs from the conventional concepts and designs of the prior art, and in so doing provides an apparatus primarily developed for the purpose of easy transportation and depositing of oil drained from a vehicle.

SUMMARY OF THE INVENTION

In view of the foregoing disadvantages inherent in the known types of oil collecting devices now present in the prior art, the present invention provides a new oil collecting and draining device construction wherein the same can be utilized for easy transportation and depositing of oil drained from a vehicle.

The general purpose of the present invention, which will be described subsequently in greater detail, is to provide a new oil collecting and draining device apparatus and method which has many of the advantages of the oil collecting devices mentioned heretofore and many novel features that result in a new oil collecting and draining device which is not anticipated, rendered obvious, suggested, or even implied by any of the prior art oil collecting devices, either alone or in any combination thereof.

To attain this, the present invention generally comprises a housing having a top wall, a bottom wall, a front wall, a back wall, a first side wall, and a second side wall. The top wall is generally divided into a first portion positioned adjacent to the back wall and a second portion positioned adjacent to the front wall. The top wall is collapsed toward the bottom wall and has a lowest point located in a central area of the first portion. The top wall has an aperture therein extending into an interior of the housing. The aperture is located in the central area of the first portion. A pipe is attached to the front wall and is in communication with an interior of the housing. A valve is positioned on the pipe for selectively opening or closing the pipe. A support structure supports the housing above a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new oil collecting and draining device apparatus and method which has many of the advantages of the oil collecting devices mentioned heretofore and many novel features that result in a new oil collecting and draining device which is not anticipated, rendered obvious, suggested, or even implied by any of the prior art oil collecting devices, either alone or in any combination thereof.

It is another object of the present invention to provide a new oil collecting and draining device which may be easily and efficiently manufactured and marketed.

It is a further object of the present invention to provide a new oil collecting and draining device which is of a durable and reliable construction.

An even further object of the present invention is to provide a new oil collecting and draining device which is susceptible of a low cost of manufacture with regard to both materials and labor, and which accordingly is then susceptible of low prices of sale to the consuming public, thereby making such oil collecting and draining device economically available to the buying public.

Still yet another object of the present invention is to provide a new oil collecting and draining device which provides in the apparatuses and methods of the prior art some of the advantages thereof, while simultaneously overcoming some of the disadvantages normally associated therewith.

Still another object of the present invention is to provide a new oil collecting and draining device for easy transportation and depositing of oil drained from a vehicle.

Yet another object of the present invention is to provide a new oil collecting and draining device which includes a housing having a top wall, a bottom wall, a front wall, a back wall, a first side wall, and a second side wall. The top wall is generally divided into a first portion positioned adjacent to the back wall and a second portion positioned adjacent to the front wall. The top wall is collapsed toward the bottom wall and has a lowest point located in a central area of the first portion. The top wall has an aperture therein extending into an interior of the housing. The aperture is located in the central area of the first portion. A pipe is attached to the front wall and is in communication with an interior of the housing. A valve is positioned on the pipe for selectively opening or closing the pipe. A support structure supports the housing above a ground surface.

Still yet another object of the present invention is to provide a new oil collecting and draining device that has a support structure which places the housing in an angular relationship with a ground surface such that the oil is more securely contained in the housing.

Even still another object of the present invention is to provide a new oil collecting and draining device that collects oil in such a manner that the oil is not easily spilled when transporting it.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
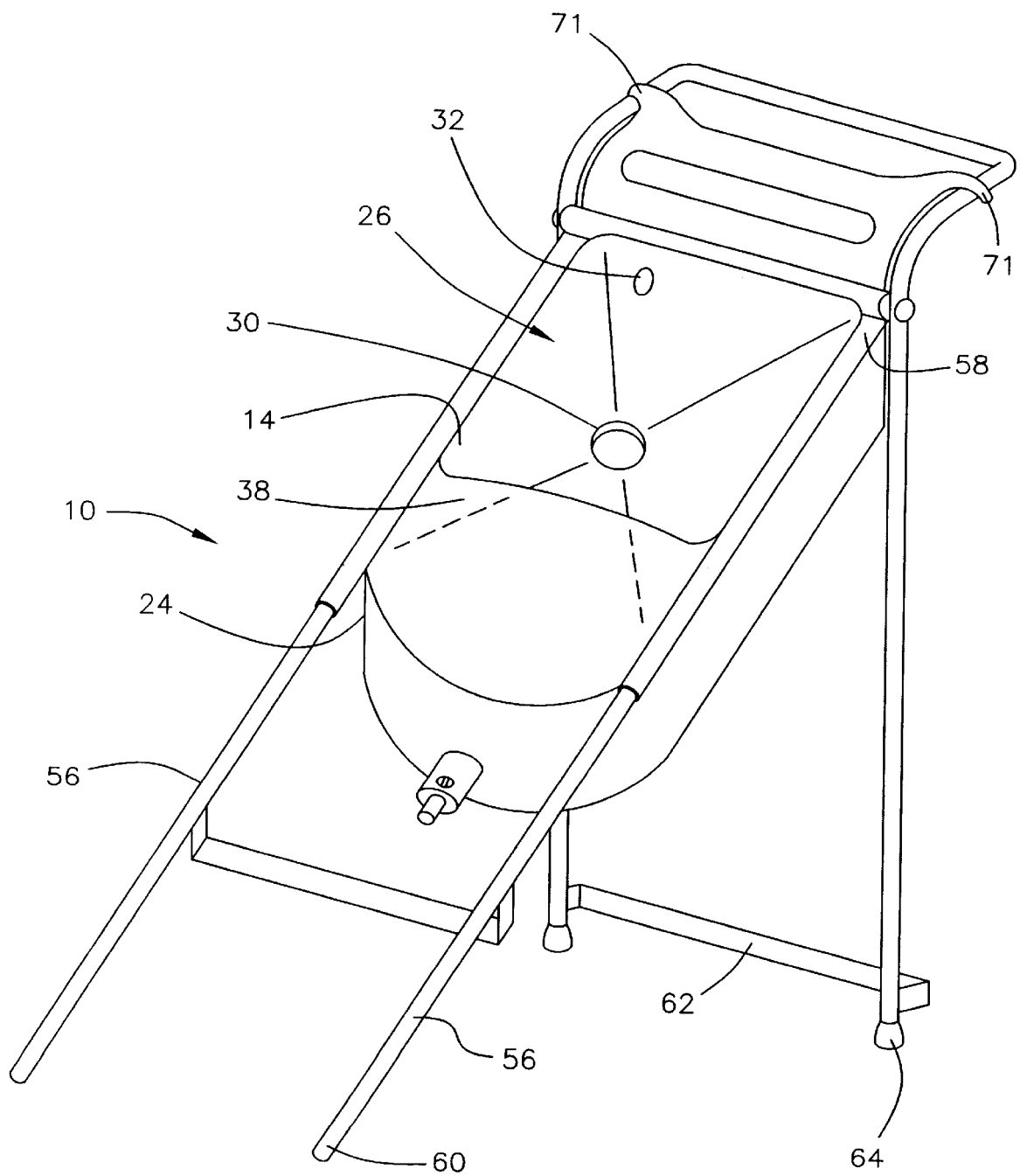
FIG. 1 is a schematic perspective view of a new oil collecting and draining device according to the present invention.
Figure 2:
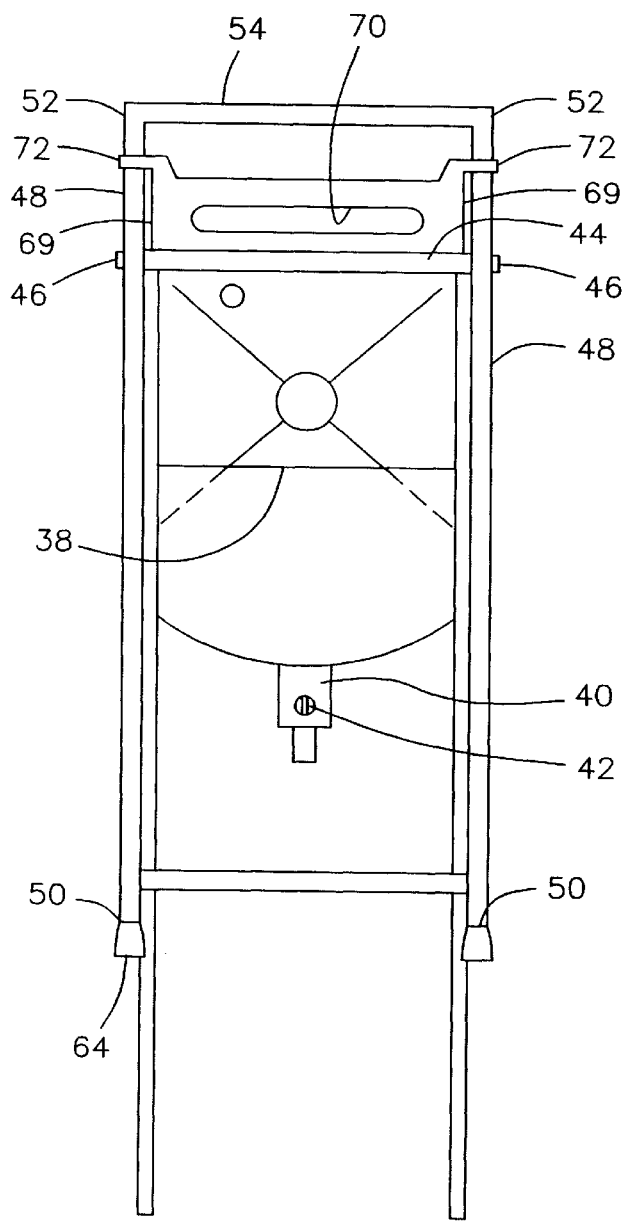
FIG. 2 is a schematic front view of the present invention.
Figure 3:
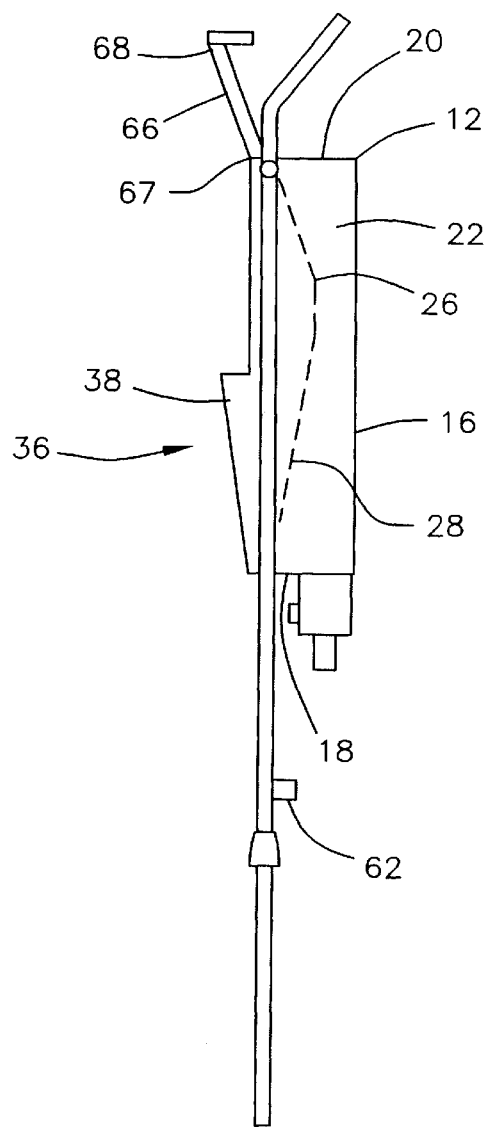
FIG. 3 is a schematic side view of the present invention.

With reference now to the drawings, and in particular to FIGS. 1 through 3 thereof, a new oil collecting and draining device embodying the principles and concepts of the present invention and generally designated by the reference numeral 10 will be described.

As best illustrated in FIGS. 1 through 3, the oil collecting and draining device 10 generally comprises a housing 12 having a top wall 14, a bottom wall 16, a front wall 18, a back wall 20, a first side wall 22, and a second side wall 24. The top wall 14 is generally divided into a first portion 26 positioned adjacent to the back wall 20 and a second portion 28 positioned adjacent to the front wall 18. The top wall 14 is collapsed toward the bottom wall 16 and has a lowest point located in a central area of the first portion 26. The top wall 14 has an aperture 30 therein extending into an interior of the housing 12. The aperture 30 is located in the central area of the first portion 26. The top wall 14 has an opening 32 therein positioned generally adjacent to the back wall 20. The housing 12 has a length measured between the front 18 and back 20 walls preferably between 12 inches and 18 inches. The housing 12 has a width measured between the first 22 and second 24 side walls preferably between 12 inches and 18 inches, and a height preferably between 6 inches and 8 inches. The lowest point of the top wall 14 is between 2 inches and 4 inches from the bottom wall 16. The front wall 18 is arcuate and extends away from the back wall 20.

A compartment 36 is positioned on the second portion 28 of the top wall 14. The compartment 36 includes a plate 38 fluidly attached to the front wall 18 and the side walls 22, 24. The plate 38 is bowed upwardly away from and spaced from the top wall 14. The plate 38 acts as a splash guard and contains excess oil should the oil be draining into the housing 12 faster than can be accommodated by the aperture 30. The opening 32 acts as an air supply for allowing increased speed of drainage of the oil into the housing 12.

A pipe 40 is attached to the front wall 18 and is in communication with an interior of the housing 12. A valve 42 is positioned on the pipe 40 for selectively opening or closing the pipe 40. The pipe 40 is used for draining the oil out of the housing 12.

A support structure supports the housing above a ground surface. The support structure includes a rod 44 attached to and extending along a length of a juncture of the top wall 14 and the back wall 20. The rod 44 has a pair of opposite ends 46 extending beyond the first 22 and second 22 side walls.

Each of a first pair of legs 48 is elongated and has a first end 50 and a second end 52. Each of the legs of the first pair of legs 48 is rotatably coupled to one of the opposite ends 46 of the rod 44. The rod 44 is positioned nearer the second end 52 than the first ends 50 of the first pair of legs 48. Each of the first pair of legs 48 has a length generally between 3 feet and 4 feet. A bar 54 extends between and is integrally coupled to the second ends 52 of the first pair of legs 48.

Each of a second pair of legs 56 is elongated and has a first end 58 and a second end 60. Each of the legs of the second pair of legs 56 is coupled to one of the first 22 and second 24 side walls such that the second pair of legs 56 extend away from the front wall 18. Each of the legs of the second pair of legs 56 extends along junctures of a respective one of side walls 22, 24 and the top wall 14. The legs of the second pair of legs 56 preferably extend between 2 feet and 3 feet away from the front wall 18.

An elongated member 62 is coupled to and extends between the first pair of legs 48. The elongated member 62 is positioned generally adjacent to the first ends 50 of the first pair of legs 48. The elongated member preferably has a U-shape and extends away from the second pair of legs 56.

Each of a pair of feet portions 64 is attached to one of the first ends 50 of the first pair of legs 48. The feet portions 64 each comprise an elastomeric material.

A bracket member 66 is attached to the rod 44 for supporting the first pair of legs 48 in a spaced relationship with the second pair of legs 56 such that the housing 12 is supported at an angle with respect to a ground surface. The bracket member 66 comprises a panel having a bottom edge 67, a top edge 68 and a pair of side edges 69. The bottom edge 67 is coupled to the rod 44. The panel, or bracket member 66, has a width smaller than a distance between the first pair of legs 48. The panel 66 is angled upward with respect to the top wall 14 of the housing 12 and away from the first pair of legs 48 as shown in FIG. 3. Each of the legs of the first pair of legs 48 is angled away from the panel 66. The panel 66 has an elongated slot 70 extending therethrough and defining a handle.

Each of pair of tabs 71 is attached to one of the side edges 69 of the panel 66 and located adjacent to the top edge 68. Each of the tabs 71 extends outwardly from the panel 66 such that a distance between free ends 72 of the tabs 71 is greater than a distance between the legs of the first pair of legs 48. Each of the tabs 71 preferably arcs towards the first pair of legs 48.

In use, the device 10 is positioned the oil pan of a vehicle. The tabs 71 are abutted against the first pair of legs 48 such that housing 12 is in an angular relationship with the ground surface. The oil plug is removed and the oil from the oil pan flows into the housing through the aperture 30. The oil comes to rest in the housing 12 between the second portion 28 of the top wall 14 and the bottom wall 16 so that the device 10 may be lifted by the handle 70 and the oil drained through the pipe 42.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An oil collecting device comprising:
   a housing having a top wall, a bottom wall, a front wall, a back wall, a first side wall, and a second side wall, said top wall being generally divided into a first portion positioned adjacent to said back wall and a second portion positioned adjacent to said front wall, said top wall being collapsed toward said bottom wall and having a lowest point located in a central area of said first portion, said top wall having an aperture therein extending into an interior of said housing, said aperture being located in said central area of said first portion;
   a pipe being attached to said front wall and being in communication with an interior of said housing;
   a valve being positioned on said pipe for selectively opening or closing said pipe; and
   a support structure for supporting said housing above a ground surface.
2. The oil collecting device as in claim 1, wherein said housing has a length measured between said front and back walls generally between 12 inches and 18 inches, said housing having a width measured between said first and second side walls generally between 12 inches and 18 inches, said housing having a height generally between 6 inches and 8 inches, said lowest point of said top wall being between 2 inches and 4 inches from said bottom wall.
3. The oil collecting device as in claim 1 wherein said front wall is arcuate and extends away from said back wall.
4. The oil collecting device as in claim 1, further including:
   a compartment being positioned on said second portion of said top wall, said compartment including a plate being fluidly attached to said front wall and said side walls, said plate being bowed upwardly away from and spaced from said top wall.
5. The oil collecting device as in claim 1, wherein said support structure including:
   a rod being attached to and extending along a length of a juncture of said top wall and said back wall, said rod having a pair of opposite ends extending beyond said first and second side walls;
   a first pair of legs each being elongated and having a first end and a second end, each of said legs of said first pair of legs being rotatably coupled to one of said opposite ends of said rod, said rod being positioned nearer said second ends than said first ends of said first pair of legs.
6. The oil collecting device as in claim 5, further including:
   a bar extending between and integrally coupled to said second ends of said first pair of legs.
7. The oil collecting device as in claim 6, further including:
   a second pair of legs each being elongated and having a first end and a second end, each of said legs of said second pair of legs being coupled to one of said first and second side walls such that said second pair of legs extend away from said front wall, each of said legs of said second pair of legs extending along junctures of a respective one of side walls and said top wall, each of said legs extending between 2 feet and 3 feet away from said front wall.
8. The oil collecting device as in claim 7, further including:
   an elongated member being coupled to and extending between said first pair of legs, said elongated member being positioned generally adjacent to said first ends of said first pair of legs.
9. The oil collecting device as in claim 7, further including:
   a bracket member being attached to said rod for supporting said first pair of legs in a spaced relationship with said second pair of legs such that said housing is supported at an angle with respect to a ground surface.
10. The oil collecting device as in claim 1, wherein said bracket member comprises:
    a panel having a bottom edge, a top edge and a pair of side edges, said bottom edge being coupled to said rod, said panel having a width smaller than a distance between said first pair of legs, said panel being angled upward with respect to said top wall of said housing and away from said first pair of legs, each of said legs of said first pair of legs being angled away from said panel, said panel having an elongated slot extending therethrough;
    a pair of tabs, each of said tabs being attached to one of said side edges of said panel and located adjacent to said top edge, each of said tabs extending outwardly from said panel such that a distance between free ends of said tabs is greater than a distance between said legs of said first pair of legs; and wherein said tabs may be selectively abutted against said first pair of legs such that housing is in an angular relationship with the ground surface.

11. An oil collecting device comprising:

a housing having a top wall, a bottom wall, a front wall, a back wall, a first side wall, and a second side wall, said top wall being generally divided into a first portion positioned adjacent to said back wall and a second portion positioned adjacent to said front wall, said top wall being collapsed toward said bottom wall and having a lowest point located in a central area of said first portion, said top wall having an aperture therein extending into an interior of said housing, said aperture being located in said central area of said first portion, said top wall having an opening therein positioned generally adjacent to said back wall, said housing having a length measured between said front and back walls generally between 12 inches and 18 inches, said housing having a width measured between said first and second side walls generally between 12 inches and 18 inches, said housing having a height generally between 6 inches and 8 inches, said lowest point of said top wall being between 2 inches and 4 inches from said bottom wall, said front wall being arcuate and extending away from said back wall;

a compartment being positioned on said second portion of said top wall, said compartment including a plate being fluidly attached to said front wall and said side walls, said plate being bowed upwardly away from and spaced from said top wall;

a pipe being attached to said front wall and being in communication with an interior of said housing;

a valve being positioned on said pipe for selectively opening or closing said pipe;

a support structure for supporting said housing above a ground surface, said support structure comprising;

a rod being attached to and extending along a length of a juncture of said top wall and said back wall, said rod having a pair of opposite ends extending beyond said first and second side walls;

a first pair of legs each being elongated and having a first end and a second end, each of said legs of said first pair of legs being rotatably coupled to one of said opposite ends of said rod, said rod being positioned nearer said second ends than said first ends of said first pair of legs, each of said first pair of legs having a length generally between 3 feet and 4 feet;

a bar extending between and integrally coupled to said second ends of said first pair of legs;

a second pair of legs each being elongated and having a first end and a second end, each of said legs of said second pair of legs being coupled to one of said first and second side walls such that said second pair of legs extend away from said front wall, each of said legs of said second pair of legs extending along junctures of a respective one of side walls and said top wall, each of said legs extending between 2 feet and 3 feet away from said front wall;

an elongated member being coupled to and extending between said first pair of legs, said elongated member being positioned generally adjacent to said first ends of said first pair of legs;

a pair of feet portions each being attached to one of said first ends of said first pair of legs, each of said feet portions comprising an elastomeric material;

a bracket member being attached to said rod for supporting said first pair of legs in a spaced relationship with said second pair of legs such that said housing is supported at an angle with respect to a ground surface, said bracket member comprising;

a panel having a bottom edge, a top edge and a pair of side edges, said bottom edge being coupled to said rod, said panel having a width smaller than a distance between said legs of said first pair of legs, said panel being angled upward with respect to said top wall of said housing and away from said first pair of legs, said first pair of legs being angled away from said panel, said panel having an elongated slot extending therethrough;

a pair of tabs, each of said tabs being attached to one of said side edges of said panel and located adjacent to said top edge, each of said tabs extending outwardly from said panel such that a distance between free ends of said tabs is greater than a distance between said first pair of legs, each of said tabs arcing towards said first pair of legs;

wherein said tabs may be selectively abutted against said first pair of legs such that housing is in an angular relationship with the ground surface.

\* \* \* \* \*